*INVENTOR.*
HENRY J. KUSA

BY

*Eber J. Hide*

ATTORNEY

United States Patent Office 3,440,445
Patented Apr. 22, 1969

3,440,445
CIRCUIT FOR SUBSTANTIALLY ELIMINATING RADIO FREQUENCY INTERFERENCE
Henry J. Kusa, Cleveland, Ohio, assignor to Clevite Corporation, a corporation of Ohio
Filed Apr. 25, 1966, Ser. No. 545,158
Int. Cl. H03k 17/16, 17/74
U.S. Cl. 307—252                          7 Claims This invention pertains to a system for substantially eliminating radio frequency interference (RFI) when turning on and off a circuit from an alternating electric power source to a load, such for example as a recording instrument or the like.

Present installations of comprehensive recording or indicating instruments for space shots are combined with radio equipment for receiving the signals to recorded, and undesirable interference with the radio signals is generated by turning on or off the AC power supply to the recording instruments.

One of the many causes of radio frequency interference (RFI) is the collapsing of magnetic fields in motors, transformers and other inductors when the circuit is interrupted at or near the peak of a cycle. Another source of RFI is generated when the closure of switch occurs near or on the peak of a cycle causing an "inrush" of current to reactive elements such as capacitors and inductors.

If the switch closure and opening can be restricted only to the part of the AC sine wave that crosses through zero, little or no interference is generated.

An object of this invention is to provide a switching circuit between an AC power source and a load, such for example as a measuring instrument, which substantially eliminates the RFI heretofore generated when turning the current to the load on or off.

For a better understanding of the present invention, together with other and further objects thereof, reference is had to the following description taken in connection with the accompanying drawings, and its scope will be pointed out in the appended claims.

With reference to the drawing there is shown in FIGURE 1 a circuit for substantially eliminating RFI when connecting an AC power source to a load.

An aspect of this invention lies in the provision of a system for controlling RFI when turning "on" and "off" an AC circuit from a power source to a load, which includes a full wave rectifier bridge with its usual DC and AC terminals, with the DC terminals being plus (+) and minus (−). A controlled rectifier having a gate (such as a silicon controlled rectifier SCR) is connected across the DC terminals of the bridge and the AC terminals of the bridge are connected in series with the load to the power supply line. In addition to the SCR a four-layer diode is connected across the DC terminals of the bridge, and a resistor is connected between the four-layer diode and the (+)DC terminal of the bridge to limit current through the diode. Further, circuit means are connected across the controlled rectifier and include switch means one terminal of which is connected to the gate of the controlled rectifier and the other terminal of which is connected to the (+)DC terminal of the bridge.

Figure 1:
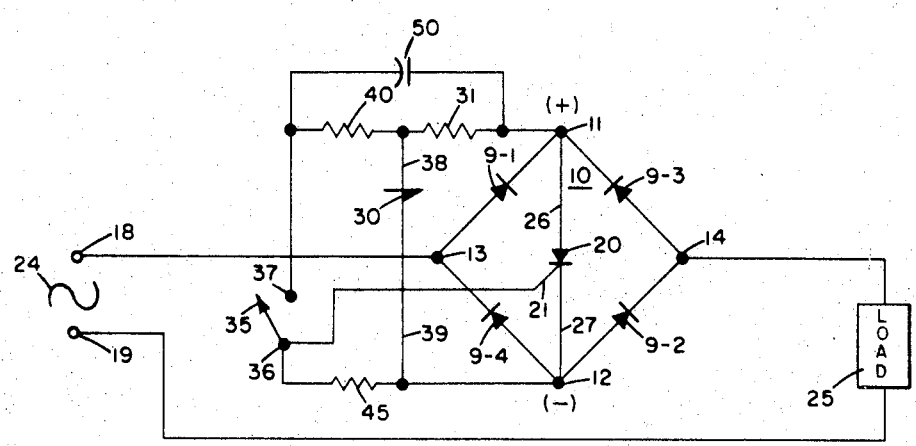

With reference to FIGURE 1 there is shown a full wave rectifier bridge 10 comprised of four rectifier diodes 9 and having a (+)DC terminal 11, a (−)DC terminal 12, and AC terminals 13 and 14. A controlled rectifier 20 having a gate 21 is connected across the DC terminals 11, 12 of the bridge 10, and the AC terminals of the bridge 10 are connected in one of the two AC power supply lines 18, 19 between AC power source 24 and the load 25. The controlled rectifier 20, in addition to the gate 21, has its anode 26 connected to the (+)DC bridge terminal 11 and cathode 27 connected to the (−)DC bridge terminal 12. The controlled rectifier 20 preferably is a silicon controlled rectifier (SCR).

A four-layer diode 30 is connected across the DC terminals 11, 12 of the bridge 10, and a first resistor 31 is located between the (+) terminal 11 and the four-layer diode 30 to limit current through the four-layer diode 30.

Circuit means are connected across the controlled rectifier 20 and include switch means 35, one terminal 36 of which is connected to the gate 21 of the SCR 20 and the other terminal 37 of which is connected to the (+)DC terminal 11 of the bridge 10. Switch 35 is used to connect the power supply source 24 to the load 25, and to disconnect it.

A second resistor 40 may be connected between the terminal 37 of switch 35 and the first resistor 31, with one terminal 38 of the four-layer diode 30 being connected between the resistors 40 and 31. Resistor 40, if utilized, limits the current in the gate circuit of the SCR 20. A third resistor 45 may be connected between terminal 36 of the switch 35 and the (−)DC terminal 12 of the bridge 10, with the other terminal 39 of the four-layer diode 30 being connected between (−)DC terminal 12 and the third resistor 45. The third resistor 45 assures the turn-off of the SCR 20 even at high temperatures.

A capacitor 50 may be connected across the first and second resistors 31, 40 to accelrate the turn-on of the SCR 20 when switch 35 is closed.

An SCR was chosen for the controlled rectifier 20 because of its characteristic that once it is turned on (fired) it will stay on as long as sufficient current flows through it to hold it in its "on" condition, but once the current falls below its "holding value" level the SCR returns to its "off" condition. Further, the SCR can control current to large loads.

*Operation of the circuit*

For simplicity in explaining the operation of the circuit it is best to first describe the "turn-off."

*Turn-off*

Assume that switch 35 is closed and AC current from source 24 is connected to load 25. When the voltage of line 18 is positive with respect to the voltage of line 19, current will flow through rectifier 9–1, through SCR 20, through rectifier 9–2 to the load 25. When the voltage of line 19 is positive with respect to the voltage of line 18, current will flow from source 24 through load 25 to AC terminal 14, through diode 9–3, through SCR 20, through diode 9–4 to AC terminal 13 and line 18 back to source 24. When the switch 35 is opened current will continue to flow through through either diodes 9–1 and 9–2, or through diodes 9–3 and 9–4, and the SCR 20 until the current passes through zero. At this time the current in the SCR 20 is below the required holding current ($Ih$) and the SCR ceases to conduct current. The circuit is now "turned off." Little or no current is flowing through the load 25 when the SCR 20 opens, and consequently little or no RFI can be generated.

*Turn-on*

Figure 2:
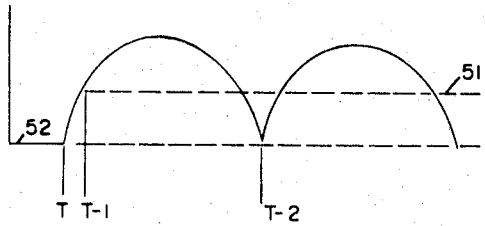
FIGURE 2 is a diagram showing a rectified AC sine wave current in relation to the turning "on" of the circuit.
Figure 3:
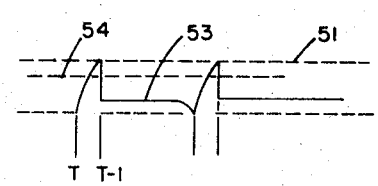
FIGURE 3 is a diagram further explaining the "turn on" of the circuit.

Assume that switch 35 is open and it is desired to turn on the power to the load 25. In order to substantially prevent or reduce RFI it is necessary that "turn on" be effected when the voltage difference between lines 18 and 19 is low. To do this the four-layer diode 30 is used. In FIGURES 2 and 3 the line 51 represents the breakdown voltage of the four-layer diode 30 above zero voltage differential line 52. When an increasing voltage is applied to the four-layer diode 30 it will not conduct until the voltage reaches the value expressed by the breakdown line 51, as shown by FIGURE 3. The four-layer diode 30 will remain in a conducting state as long as the current flowing through it does not drop below its "holding current" level 53. When it does go below the "holding current" level it returns to its "open" condition. The increasing voltage is also being applied to the SCR 20 which has a lower breakdown level than the diode 30, and which is expressed by line 54 in FIGURE 3. If the switch 35 is closed at a time between T and T–1 the voltage will rise to, or will exceed, the level 54 required to fire SCR 20 and the current will turn on. However, below the firing voltage voltage 54 the inrush currents to the load 25 are still low enough to produce very little, if any, RFI.

If the switch 35 is closed at a time between T–1 and T–2 when the voltage is high enough to cause RFI, the voltage already has exceeded the breakdown level 51 of the four-layer diode, causing it to become conductive and short out the gate signal, thereby to prevent SCR 20 from being turned on. The gate signal remains shorted until T–2 is reached, at which point it opens causing the SCR to fire and close the circuit. At this time since the voltage involved is low, RFI is not a problem.

In the circuit shown in FIGURE 1 the first resistor 31 limits the current flowing through the four-layer diode 30 when it becomes conductive, and resistor 31 in conjunction with the second resistor 40 to limit the current in the gate circuit 21. The third resistor 45 assures the "turn-off" of the SCR 20 even at elevated operating temperatures.

Capacitor 50 accelerates the 'turn-on" of SCR 20.

It will be seen that the aforedescribed circuit operates as a switch, and it permits power from source 24 to be applied to load 25 only when the input sine wave is at or near zero potential, and it controls the turn-off time so that it occurs near zero potential of the sine wave. Consequently, very little, if any, RFI can be generated by reactive components of the load 25.

Figure 4:
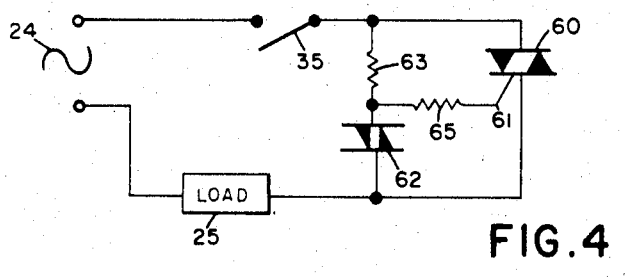
FIGURE 4 shows a modified circuit.

FIGURE 4 illustrates a modified circuit which also substantially eliminates RFI when connecting power source 24 to the load 25 by closing switch 35. Triac 60 is, in effect, two SCR's with a common gate 61. It acts as a full wave rectifier and it triggers on either polarity. Across the triac 60 is the bilateral diac 62 and the resistor 63. The diac 62 acts like two four-layer diodes back to back. A resistor 65 is located in the common gate to the triac. The diac 62 becomes conductive for current of either polarity at a level higher than the voltage required to fire the SCR in either direction. If switch 35 is closed at an instant when the voltage is below the breakdown level of the diac, the triac becomes conductive in either one of two directions. If, however, the switch 35 is closed when the voltage is above the breakdown level of the diac when RFI would be generated, the diac becomes conductive and prevents the circuit from turning on until the voltage drops to a low level and then rises sufficiently to fire the triac.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A system for controlling RFI when turning on and off an alternating current circuit from a line power source to a load, comprising, a switch in the line between the power source and the load, silicon controlled rectifier means having a gate circuit in said line, and four-layer diode means connected in said line and across said silicon controlled rectifier means and connected to the said gate circuit, the breakdown voltage level of said four-layer diode means being slightly greater than the voltage level required to fire said silicon controlled rectifier means, whereby, upon said switch being closed at or near zero voltage potential on said line the silicon controlled rectifier will fire upon said voltage rising slightly, and whereby, upon said switch being closed when there is a potential on said line exceeding the breakdown level of the four-layer diode means the silicon controlled rectifier means is prevented from firing.

2. A system for controlling RFI when turning on and off an alternating current circuit as set forth in claim 1, further characterized by: said silicon controlled rectifier means comprising a triac connected as a full wave rectifier and having a common gate so that it can trigger on either polarity, and said four-layer diodes means comprising a bilateral diac which can become conductive on either polarity.

3. A system for controlling RFI when turning on and off an alternating current circuit from a two-line power source to a load, comprising, a full wave rectifier bridge having DC and AC terminals, the DC terminals being plus and minus, a controlled rectifier having a gate connected across the DC terminals of said bridge, the AC terminals of said bridge being connected in one of said lines between said power source and said load, a four-layer diode connected across the DC terminals of said bridge, first resistor means connected between said four-layer diode and the plus DC terminal of said bridge to limit current through said four-layer diode, circuit means connected across said controlled rectifier including switch means one terminal of which is connected to the gate of said controlled rectifier, and another terminal of which is connected to the plus DC terminal of said bridge.

4. A system as set forth in claim 3, further characterized by said circuit means connected across said controlled rectifier being connected to the plus and minus terminals of said bridge.

5. A system as set forth in claim 4, further characterized by said four-layer diode being connected across said circuit means, and second resistor means connected between said other terminal of said switch means and the said (+)DC terminal of said bridge, said first and second resistors limiting the current at said gate.

6. A system as set forth in claim 5, further characterized by capacitor means connected in parallel across said first and second resistor means to accelerate the turn-on of said controlled rectifier.

7. A system as set forth in claim 6, further characterized by third resistor means connected between the said (−)DC terminal of said bridge and said one terminal of said switch means to assure the turn-off of said controlled rectifier.

References Cited

UNITED STATES PATENTS

| | | | |
|---|---|---|---|
| 3,259,834 | 7/1966 | Wright | 323—22 |
| 3,368,140 | 2/1968 | Tobey | 307—305 X |
| 3,390,275 | 6/1968 | Baker | 307—252 X |

FOREIGN PATENTS

| | | |
|---|---|---|
| 1,346,137 | 11/1963 | France. |

ARTHUR GAUSS, *Primary Examiner.*

DONALD D. FORRER, *Assistant Examiner.*

U.S. Cl. X.R.

307—202, 305, 324; 315—272; 317—33